(12) United States Patent  (10) Patent No.: US 9,181,634 B2
Sailor et al.  (45) Date of Patent: *Nov. 10, 2015

(54) OPTICALLY ENCODED PARTICLES THROUGH POROSITY VARIATION

(75) Inventors: Michael J. Sailor, La Jolla, CA (US); Shawn O. Meade, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 973 days.

This patent is subject to a terminal disclaimer.

(21) Appl. No.: 10/583,920

(22) PCT Filed: Dec. 21, 2004

(86) PCT No.: PCT/US2004/043001
§ 371 (c)(1),
(2), (4) Date: Jun. 20, 2006

(87) PCT Pub. No.: WO2005/062866
PCT Pub. Date: Jul. 14, 2005

(65) Prior Publication Data
US 2007/0148695 A1  Jun. 28, 2007

Related U.S. Application Data

(63) Continuation-in-part of application No. 10/503,217, filed as application No. PCT/US03/03040 on Jan. 31, 2003.

(60) Provisional application No. 60/532,278, filed on Dec. 22, 2003, provisional application No. 60/355,234, filed on Feb. 7, 2002.

(51) Int. Cl.
*C40B 20/04* (2006.01)
*C40B 20/08* (2006.01)
(Continued)

(52) U.S. Cl.
CPC ............ *C40B 20/08* (2013.01); *B01J 19/0046* (2013.01); *B82Y 20/00* (2013.01); *C40B 20/04* (2013.01);
(Continued)

(58) Field of Classification Search
CPC ................................ C40B 30/06; C40B 20/04
USPC ............................................. 506/13; 435/287
See application file for complete search history.

(56) References Cited

U.S. PATENT DOCUMENTS

| RE33,581 E | 4/1991 | Nicoli et al. |
| 5,071,248 A | 12/1991 | Tiefenthaler et al. |
| 5,168,104 A * | 12/1992 | Li et al. ............................ 521/64 |
| 5,218,472 A | 6/1993 | Jozefowicz et al. |
| 5,318,676 A | 6/1994 | Sailor et al. |

(Continued)

FOREIGN PATENT DOCUMENTS

| WO | WO 00-66190 | 11/2000 |
| WO | WO 03-067231 | 8/2003 |
| WO | WO 2004-071949 | 8/2004 |
| WO | WO 2005-034725 | 4/2005 |
| WO | WO 2005-062865 | 7/2005 |

OTHER PUBLICATIONS

Chan et al. (Nanoscale microcavities for biomedical sensor applications, 2000, Proceedings of SPIE, vol. 3912, pp. 23-34).*

(Continued)

*Primary Examiner* — Christopher M Gross
*Assistant Examiner* — Richard L Manteuffel
(74) *Attorney, Agent, or Firm* — Greer, Burns & Crain, Ltd.

(57) ABSTRACT

The invention concerns a particle having a code from a library of codes embedded in its physical structure by refractive index changes between different regions of the particle. In preferred embodiments, a thin film possesses porosity that varies in a manner to produce a code detectable in the reflectivity spectrum. An assay detection method uses such a particle and detects a spectral shift in the presence of an analyte. Additional embodiments are disclosed including additional features.

17 Claims, 13 Drawing Sheets

(51) Int. Cl.

| | | |
|---|---|---|
| *B01J 19/00* | (2006.01) | |
| *B82Y 20/00* | (2011.01) | |
| *C40B 30/04* | (2006.01) | |
| *C40B 40/06* | (2006.01) | |
| *C40B 40/10* | (2006.01) | |
| *C40B 40/12* | (2006.01) | |
| *C40B 40/18* | (2006.01) | |
| *C40B 50/14* | (2006.01) | |
| *C40B 70/00* | (2006.01) | |

(52) U.S. Cl.
CPC .................. *C40B 30/04* (2013.01); *C40B 40/06* (2013.01); *C40B 40/10* (2013.01); *C40B 40/12* (2013.01); *C40B 40/18* (2013.01); *C40B 50/14* (2013.01); *C40B 70/00* (2013.01); *B01J 2219/005* (2013.01); *B01J 2219/0054* (2013.01); *B01J 2219/0056* (2013.01); *B01J 2219/0072* (2013.01); *B01J 2219/00497* (2013.01); *B01J 2219/00547* (2013.01); *B01J 2219/00554* (2013.01); *B01J 2219/00565* (2013.01); *B01J 2219/00576* (2013.01); *B01J 2219/00596* (2013.01); *B01J 2219/00722* (2013.01); *B01J 2219/00725* (2013.01); *B01J 2219/00731* (2013.01)

(56) References Cited

U.S. PATENT DOCUMENTS

| | | | |
|---|---|---|---|
| 5,427,648 A | 6/1995 | Pamulapati et al. | |
| 5,468,606 A | 11/1995 | Bogart et al. | |
| 5,589,422 A * | 12/1996 | Bhat ............... | 438/476 |
| 5,696,629 A | 12/1997 | Berger et al. | |
| 5,763,176 A | 6/1998 | Slater et al. | |
| 5,928,726 A | 7/1999 | Butler et al. | |
| 6,096,496 A | 8/2000 | Frankel et al. | |
| 6,130,748 A | 10/2000 | Kruger et al. | |
| 6,206,065 B1 | 3/2001 | Robbie et al. | |
| 6,248,539 B1* | 6/2001 | Ghadiri et al. ............ | 435/7.1 |
| 6,355,431 B1 | 3/2002 | Chee et al. | |
| 6,396,995 B1 | 5/2002 | Stuelpnagel et al. | |
| 6,429,027 B1 | 8/2002 | Chee et al. | |
| 6,544,732 B1 | 4/2003 | Chee et al. | |
| 6,620,584 B1 | 9/2003 | Chee et al. | |
| 6,663,832 B2 | 12/2003 | Lebl et al. | |
| 6,678,619 B2 * | 1/2004 | Lobanov et al. ............ | 506/13 |
| 6,770,441 B2 | 8/2004 | Dickinson et al. | |
| 6,778,272 B2 * | 8/2004 | Nakano et al. ............ | 356/336 |
| 6,812,005 B2 | 11/2004 | Fan et al. | |
| 6,846,460 B1 | 1/2005 | Lebl | |
| 6,858,394 B1 | 2/2005 | Chee et al. | |
| 6,919,009 B2 | 7/2005 | Stonas et al. | |
| 6,970,239 B2 | 11/2005 | Chan et al. | |
| 7,042,570 B2 | 5/2006 | Sailor et al. | |
| 7,225,082 B1 | 5/2007 | Natan | |
| 7,226,733 B2 * | 6/2007 | Chan et al. ............ | 435/6 |
| 7,318,903 B2 | 1/2008 | Link et al. | |
| 2002/0192680 A1 | 12/2002 | Chan et al. | |
| 2003/0124564 A1* | 7/2003 | Trau et al. ............ | 435/6 |
| 2003/0170280 A1 | 9/2003 | Canham et al. | |
| 2003/0203390 A1 | 10/2003 | Kaye et al. | |
| 2005/0009374 A1 | 1/2005 | Gao et al. | |
| 2005/0042764 A1 | 2/2005 | Sailor et al. | |
| 2005/0058416 A1 | 3/2005 | Hoon Lee et al. | |
| 2005/0266045 A1 | 12/2005 | Canham et al. | |
| 2006/0096922 A1 | 5/2006 | Gin et al. | |
| 2006/0105043 A1 | 5/2006 | Sailor et al. | |
| 2007/0051815 A1 | 3/2007 | Sailor et al. | |

OTHER PUBLICATIONS

Chan et al. (SPIE Conference on silicone-based optoelectronics, 1999, SPIE vol. 3630, pp. 144-154, "Silicon Interference Filters and Bragg Reflectors for Active and Passive Integrated Optoelectronic Components").*

Chan et al. (Proceedings of the SPIE, Micro- and Nanotechnology for Biomedical and Environmental Applications, 2000, SPIE vol. 3912, pp. 23-24, "Nanoscale Microcavities for Biomedical Sensor Applications").*

Janshoff et al. (JACS, 1998, vol. 120, pp. 12108-12116, "Macroporous p-Type Silicon Fabry-Perot Layers. Fabrication, Characterization, and Applications in Biosensing").*

Eric J. Lee et al., "Photoderivation of the Surface of Luminescent Porous Silicon with Formic Acid", *J. Am. Chem. Soc.*, vol. 117, 8295-96 (1995).

V.S.Y. Lin et al., "A Porous Silicon-Based Optical Interferometric Biosensor", *Science*, vol. 278, pp. 840-842 (Oct. 31, 1997).

Andreas Janshoff et al., "Macroporous p-Type Siicon Fabry-Perot Layers. Fabrication, Characterization, and Applicationsin Biosensing", *J. Am. Chem. Soc.*, vol. 120, pp. 12108-12116 (1998).

S. R. Nicewarner-Peña et al., "Submicrometer Metallic Barcodes", *Science*, vol. 294, pp. 137-141 (Oct. 5, 2001).

L. Pavesi et al., "Random Porous Silicon Multilayers: Application to Distributed Bragg Reflectors and Interferential Fabry-Pérot Filters", *Semicond. Sci. Technol.*, vol. 12, pp. 570-575 (1997).

D. Van Noort et al., "Monitoring Specific Interaction of Low Molecular Weight Biomolecules on Oxidized Porous Silicon Using Ellipsometry", *Biosensors & Bioelectronics*, vol. 13, No. 3-4, pp. 439-449 (1998).

M. Thonissen et al., Section 1.4, "Multilayer Structures of Porous Silicon", In *Properties of Porous Silicon*, (Eds: L. Canham). EMIS Datareviews, vol. 8, Short Run Press Ltd., London, pp. 30-37 (1997).

Honglae Sohn et al., "Detection of Fluorophosphonate Chemical Warefare Agents by Catalytic Hydrolysis with a Porous Silicon Interferometer", *J. Am. Chem. Soc.*, vol. 122, pp. 5399-5400 (2000).

M.J. Sailor, "Sensor Applications of Porous Silicon", Section 12.4, In *Properties of Porous Silicon*, (Eds: L. Canham). EMIS Datareviews, vol. 8, Short Run Press Ltd., London, pp. 364-370 (1997).

J.R. Quagliano et al., "Quantitative Chemical Identification of Four Gases in Remote Infrared (9-11 µm) Differential Absorption Lidar Experiments", *Applied Optics*, vol. 36, No. 9, pp. 1915-1927 (Mar. 20, 1997).

M.J. Sailor et al., "Low-Power Microsenors for Explosives and Nerve Warfare Agents Using Silicon Nanodots and Nanowires", In SPIE Meeting on Unattended Ground Sensor Technologies and Applications, (Ed: E.M. Carapezza, D.B. Law and K.T. Stalker). SPIE, 2000.

B. Warneke et al., "Smart Dust: Communicating with a Cubic-Millimeter Computer", *Computer*, pp. 44-51 (Jan. 2001).

V.G. Cheung et al., "Making and Reading Microarrays", *Nature Genetics Supplement*, vol. 21, pp. 15-19, (Jan. 1999).

L.T. Canham et al., "Derivatized Porous Silicon Mirrors: Implantable Optical Components with Slow Resorbability", *Physica*, vol. 182, No. 1, pp. 521-525 (2000).

A.P. Bowditch, "In-Vivo Assessment of Tissue Compatibility and Calcification of Bulk and Porous Silicon", *Materials Research Society Symp. Proc.*, vol. 536, pp. 149-154 (1999).

S. Chan et al., "Porous Silicon Microcavities for Biosensing Applications", *Phys. Stat. Sol.*, vol. 182, pp. 541-546 (2000).

"Abstracts of Oak Ridge Posters", *Clinical Chem.*, vol. 46, No. 9, pp. 1487-1522 (2000).

K.P.S. Dancil et al., "A Porous Silicon Optical Biosensor: Detection of Reversible Binding of IgG to a Protein A-Modified Surface," *J. Am. Chem. Soc.*, vol. 121, pp. 7925-7930 (1999).

J.H. Holtz et al., "Polymerized Colloidal Crystal Hydrogel Films as Intelligent Chemical Sensing Materials", *Nature*, vol. 389, pp. 829-832 (Oct. 23, 1997).

J. Gao et al., "Porous-Silicon Vapor Sensor Based on Laser Interferometry", *Applied Physics Letters*, vol. 77, No. 6, pp. 901-903 (Aug. 7, 2000).

J.M. Lauerhaas et al., "Chemical Modification of the Photoluminescence Quenching of Porous Silicon", *Science*, vol. 261, pp. 1567-1568 (Sep. 17, 1993).

J.L. Heinrich et al., "Luminescent Colloidal Silicon Suspensiosn from Pourous Silicon", *Science*, vol. 255, No. 5040, pp. 66-68 (Jan. 3, 1992).

M.D. Ray et al., "Ultraviolet Mini-Raman Lidar for Stand-Off, in situ, Identification of Chemical Surface Contaminants", *Review of Scientific Instruments*, vol. 71, No. 9, pp. 3485-3489 (Sep. 2000).

(56) References Cited

OTHER PUBLICATIONS

N.F. Starodub et al., "Use of the Silicon Crystals Photoluminescence to Control Immunocomplex Formation", *Sensors and Actuators*, pp. 44-47, (1996).
M.J. Sailor et al., "Detection of DNT, TNT, HF and Nerve Agents Using Photoluminescence and Interferometry from a Porous Silicon Chip", In *Unattended Ground Senor Technologies and Applications II*, Proceedings of SPIE, vol. 4040, pp. 95-104 (2000).
L. Pavesi et al., "Controlled Photon Emission in Porous Silicon Microcavities", *Appl. Phys. Lett.*, vol. 67, No. 22, pp. 3280-3282 (Nov. 27, 1995).
C. Mazzoleni et al., "Application to Optical Components of Dielectric Porous Silicon Multilayers", *Appl. Phys. Lett.*, vol. 67, No. 20, pp. 2983-2985 (Nov. 13, 1995).
V. Lehmann et al., "Optical Shortpass Filters Based on Macroporous Silicon", *Applied Physics Letters*, vol. 78, No. 5, pp. 589-591 (Jan. 29, 2001).
A.M. Tinsley-Bown et al., "Tuning the Pore Size and Surface Chemistry of Porous Silicon for Immunoassays", *Phys. Stat. Sol.*, vol. 182, pp. 547-553 (2000).
P.A. Snow et al., "Vapor Sensing using the Optical Properties of Porous Silicon Bragg Mirrors", *Journal of Applied Physics*, vol. 86, No. 4, pp. 1781-1784 (Aug. 15, 1999).
G. Vincent, "Optical Properties of Porous Silicon Superlattices", *Appl. Phys. Lett.*, vol. 64, No. 18, pp. 2367-2369 (May 2, 1994).
V. Wulmeyer et al., "Ground-Based Differential Absorption Lidar for Water-Vapor Profiling: Assessment of Accuracy, Resolution, and Meteorological Applications", *Applied Optics*, vol. 37, No. 18, pp. 3825-3844 (Jun. 20, 1998).
M. Bruchez, Jr. et al., "Semiconductor Nanocrystals as Fluorescent Biological Labels", *Science*, vol. 281, pp. 2013-2016 (Sep. 25, 1998).
C.B. Carlisle et al., "$CO_2$ Laser-Based Differential Absorption Lidar System for Range-Resolved and Long-Range Detection of Chemical Vapor Plumes", *Applied Optics*, vol. 34, No. 27, pp. 6187-6200 (Sep. 20, 1995).
S. Chan et al., "Identification of Gram Negative Bacteria Using Nanoscale Silicon Microcavities", *J. Am. Chem. Soc.*, vol. 123, No. 47, pp. 11797-11798 (2001).
C.L. Curtis et al., "Observation of Optical Cavity Modes in Photoluminescent Porous Silicon Films", *J. Electrochem. Soc.*, vol. 140, No. 12, pp. 3492-3494 (Dec. 1993).
S. Content et al., "Detection of Nitrobenzene, DNT, and TNT Vapors by Quenching of Porous Silicon Photoluminescence", *Chem. Eur. J.*, vol. 6, No. 12, pp. 2205-2213 (2000).
D. Gerion et al., "Synthesis and Properties and Biocompatible Water-Soluble Silica-Coated CdSe/ZnS Semiconductor Quantum Dots", *J. Phys. Chem. B*, vol. 105, pp. 8861-8871 (2001).
M.R. Henry, et al., "Real-Time Measurements of DNA Hybridization on Microparticles with Fluorescence Resonance Energy Transfer", *Analytical Biochemistry*, vol. 276, pp. 204-214 (1999).
P. Coronado et al., "New Technologies to Support NASA's Mission to Planet Earth Satellite Remote Sensing Product Validation: The Use of an Unmanned Autopilotd Vehicle (UAV) as a Platform to Conduct Remote Sensing", Part of the SPIE Conference on Robotic and Semi-Robotic Ground Vehicle Technology, Orlando, FL Apr. 1998, vol. 3366, pp. 38-49.
D.F. Shriver, "The Manipulation of Air-Sensitive Compounds", 2d Ed., John Wiley & Sons, Inc. New York, 1986, pp. 290-311.
F. Cunin et al., "Biomolecular Screening with Encoded Porous-Silicon Photonic Crystals", Nature Materials, vol. 1, pp. 39-41. (Sep. 2002).
M.G. Berger et al., "Dielectric Filter Made of Porous Silicon: Advanced Performance by Oxidation and New Layer Structures", Thin Solid Films, vol. 297, pp. 237-240 (1997).
H. Fenniri et al., J. Am. Chem. Soc., vol. 123, pp. 8151-8152 (2001).

H. Fenniri et al., Angew. Chem. Int. Ed., vol. 39, pp. 4483-4485 (2000).
W.C.W. Chan et al., "Quantum Dot Bioconjugates for Ultrasensitive Nonisotopic Detection", Science, vol. 281, pp. 2016-2018 (1998).
J.A. Ferguson et al., "A Fiber Optic DNA Biosensor Microarray for the Analysis of Gene Expression", Nature Biotechnol, vol. 14, pp. 1681-1684 (1996).
M. Thonissen et al., Properties of Porous Silicon, vol. 18, pp. 12-22, (ed. L. Canham) (Short Run, London 1997).
A. Halimaoui, Properties of Porous Silicon, vol. 18, pp. 12-22, (ed. L. Canham) (Short Run, London 1997).
J. Vuckovic et al., "Optimization of Three-Dimensional Micropost Microcavities for Cavity Quantum Electrodynamics", Physical Review A., vol. 66, 2002, pp. 023808-1-023808-9.
Office Action dated Feb. 5, 2010 from U.S. Appl. No. 10/503,217, Michael J. Sailor.
Office Action dated Mar. 3, 2010 from U.S. Appl. No. 10/589,741, Michael J. Sailor.
Office Action dated May 21, 2010 from U.S. Appl. No. 10/583,920, Michael J. Sailor.
Allongue, P., "Porous silicon formation mechanisms", *Properties of Porous Silicon*, (Eds.: L. Canham) EMIS Datareviews, vol. 8, Short Run Press Ltd., London, Aug. 1997, pp. 3-11.
Arwin, H., et. al., "Protein Adsorption in Thin Porous Silicon Layers", *phys. stat. sol.* (a), 182, 515, 2000.
Bean, Kenneth E., "Anisotropic Etching of Silicon", *IEEE Transactions on Electron Devices*, vol. ED-25, No. 10, Oct. 1978.
Berry, Catherine C., et. al., "Functionalisation of magnetic nanoparticles for applications in biomedicine", *J. Phys. D: App. Phsy*, 36, 2003, R198-R206.
Collins, Boyce E., et. al., "Determining Protein Size Using an Electrochemically Machined Pore Gradient in Silicon", *Adv. Fund. Mater.*, Mar. 2002, 12, No. 3.
Dancil, Keiki-Pua S., et. al., "A Porous Silicon Optical Biosensor: Detection of Reversible Binding of IgG to a Protein A-Modified Surface", *J. Am. Chem. Soc.*, 1999, 121, pp. 7925-7930.
Foraker, Amy B., et. al., "Microfabricated Porous Silicon Particles Enhance Paracellular Delivery of Insulin across Intestinal Caco-2 Cell Monolayers", *Pharmaceutical Research*, vol. 20, No. 1, Jan. 2003.
Lammel, G., et. al., "Miorospectrometer based on a tunable optical filter of porous silicon", *Sensors and Actuators A*, 92 (2001) pp. 52-59.
Mazzoleni, C., et. al., "Application to optical components of dielectric porous silicon multilayers", *Appl. Phys. Lett*, 67 (20) Nov. 13, 1995.
Meade. Shawn O., "Porous Silicon Photonic Crystals as Encoded Microcarriers", *Adv. Mater.*, Oct. 18, 2004, 16. No. 20.
Pelligrini, Vittorio, et. al. "Enhanced optical properties in porous silicon microcavities", *Physical Review B*, vol. 52, No. 20, Nov. 15, 1995.
Setzu, et. al., "Optical properties of multilayered porous silicon", *Materials Science and Engineering*, B69-70 (2000) 34-42.
Squire, E.K., et. al., "Light emission from porous silicon single and multiple cavities", *Journal of Luminescence*, 80 (1999) pp. 125-128.
Zangooie, S., et. al., "Vapor sensitivity of thin porous silicon layers", *Sensors and Actuators B*, 43 (1997) 168-174.
Zangooie, S., et. al., "Ellipsometric characterization of anisotropic porous silicon Fabry-Perot filters and investigation of temperature effects on capillary condensation efficiency", *J. of Applied Physics*, vol. 86, No. 2, Jul. 15, 1999.
Krueger, M., et al., "Color-sensitive photodetector based on porous silicon superlattices", *Thin Solid Films*, 297, (1997), pp. 241-244.

\* cited by examiner

OPTICALLY ENCODED PARTICLES THROUGH POROSITY VARIATION

PRIORITY CLAIM

This application was filed as a 35 U.S.C. §371 of PCT/US04/43001, which was filed on Dec. 21, 2004, and which claims priority benefits under 35 U.S.C. §§119 & 365 on the basis of Provisional Patent Application No. 60/532,278, filed Dec. 22, 2003. This application claims priority benefits under 35 U.S.C. §§120 and 365 and is a continuation-in-part of co-pending application Ser. No. 10/503,217, filed Aug. 2, 2004, which application was filed as a §371 of PCT/US03/03040, filed Jan. 31, 2003, and which claims priority benefits under 35 U.S.C. §§119 & 365 on the basis of Provisional Patent Application No. 60/355,234, filed Feb. 7, 2002.

This invention was made with Government assistance under DARPA Grant Nos. CHE 7854 and DASG60-03-C-0014. The Government has certain rights in this invention.

TECHNICAL FIELD

A field of the invention is encoding. Additional exemplary fields of the invention include the life sciences, security, product marking, food processing, agriculture, and chemical detection.

BACKGROUND ART

A well-appreciated need for labeling exists in society. Labeling is a fundamental basis for tracking and identifying. Encoding can be used as a form of labeling understood by persons or equipment, as in the case of bar coding. At the microscale, however, labeling/encoding itself becomes difficult.

Strategies to encode microscale materials have accordingly received increased attention for such uses as high-throughput screening in the fields of drug discovery, genetics screening, biomedical research, and biological and chemical sensing. Concurrent research strategies for measuring an increased number of analytes while minimizing the necessary sample volume have focused on either on-chip spatially differentiated arrays or encoded beads. Large arrays have been developed for biological and/or chemical sensing purposes by making use of positional encoding to register specific analyte responses. The main advantage of using an array over a conventional single analyte sensor is the ability to process and analyze a large number of analytes simultaneously. Positional arrays, however, can suffer from slow diffusion rates and limits on the concentration ranges of analytes being sensed. An alternative approach is to use individually encoded beads.

Early attempts to encode particles used fluorescent or infrared-active molecules as binary markers. More recently, cadmium selenide quantum dots have been demonstrated as viable candidates for particle encoding based on their unique fluorescent properties. Quantum dots have the advantage over organic molecules of increased stability towards photobleaching, sharper fluorescence peaks, improved solubility characteristics, and large excitation frequency ranges. With six colors (limited to the peak width of the fluorescence in the visible range) and ten intensity levels, $10^6$ particles could theoretically be encoded. In practice, this number is difficult to obtain because of spectral overlap and sample inhomogeneities. Also, despite the increased photostability of quantum dots, fluorescence quenching is still possible, casting uncertainty on using relative intensity measurements as a reliable encoding method.

Another encoding strategy has used sub-micron metallic rods. The sub-micron metallic rods are prepared by electrodeposition of metals on a porous membrane in alternating strips of controlled thickness. Different reflection characteristics of the various metals are used as a barcode for identification purposes. Reflection spectroscopy does not have the disadvantage of photobleaching inherent with fluorophores. Additionally, fluorescent analytes do not interfere with the particle signal. Deposition of rods is a relatively complex process, however, and may be difficult to apply as an encoding strategy where, for example, a large number of codes is desirable because each rod must be brought into focus in an optical reader (such as a microscope) in order to read out the codes.

Fluorescent molecule encoding, core-shell quantum dot encoding, and photonic crystal encoding using Rugate and Bragg reflectivity theory rely upon creating spectral lines that act as bits. The number of possible codes is limited to $2^n$, where n is the number of spectral lines or bits that are discernable from other lines in a spectrum. There remains a need for encoding strategies at the microscale.

DISCLOSURE OF THE INVENTION

The invention concerns a particle having a code from a library of codes embedded in its physical structure by refractive index changes between different regions of the particle. In preferred embodiments, a thin film possesses porosity that varies in a manner to produce a code detectable in the reflectivity spectrum. An assay detection method uses such a particle and detects a spectral shift in the presence of an analyte. Additional embodiments are disclosed including additional features.

BEST MODE OF CARRYING OUT THE INVENTION

The invention concerns a particle having a code from a library of codes embedded in its physical structure by refractive index changes between different regions of the particle. A change in the refractive index is preferably obtained by varying porosity formed in the particle. Reflections taken from a particle produce an optical signature that uniquely corresponds to the code from a library of codes that was used to create the particle via a computer waveform controlled etch. Reflections may be in the visible and/or non-visible wavelengths. A library of codes provides a high number of waveforms that each produce a unique optical signature when the waveform controls an etch to create the particle. In preferred embodiment formation methods, a multi-layer porous encoded structure is produced by an etching process during which the etching conditions are varied during pore formation. A dicing may be conducted to form individual encoded particles having a range of small sizes, e.g., from hundreds of nanometers to hundreds of microns.

Methods and particles of the invention are applicable to a variety of industries, including but not limited to drug discovery, biological screening, chemical screening, biological labeling, chemical labeling, in vivo labeling, security identification and product marking. Various attributes of the particles and methods of the invention enable a wide range of applications in various industries. The small size of the particles facilitates ready incorporation into various hosts, e.g., products, test kits, assays, powders (such as explosives for identification), pastes, liquids, glass, paper, and any other host or system that can accept small particles. In vivo detection is enabled by biocompatible particles of the invention, which may then be queried, for example, through tissues using near infrared and infrared wavelengths that penetrate tissues.

In accordance with the aforementioned exemplary aspects and applications of the inventions, preferred embodiment particles are identified by the code inherent to the reflectivity spectrum of their varying porous structure. In another aspect of the invention, matter, e.g., biological or chemical matter, is hosted by the porous structure and the particle becomes a tag identifying the matter hosted by the pores. In another aspect of the invention, a variance in the reflectivity spectrum of an encoded particle can indicate the presence, absence or quantity of matter within the particle's pores.

Figure 1:
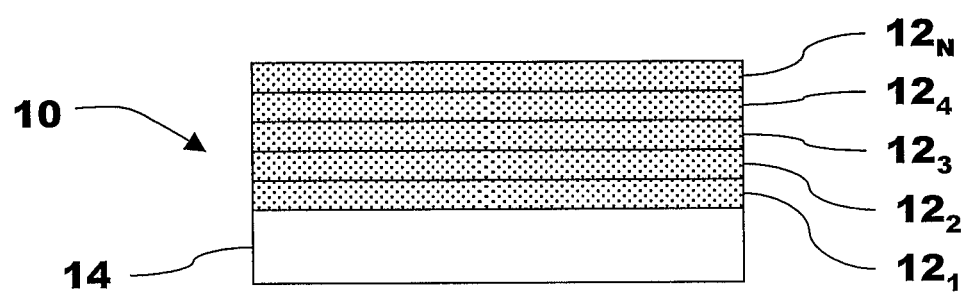
FIG. 1 is a schematic diagram of a multi-layer encoded particle of the invention.

Referring to FIG. 1, a preferred embodiment encoded particle 10 is shown in cross-section. The encoded particle 10 includes a multi-layer porous thin film having layers or regions $12_1$-$12_N$. Multi-layer, as used herein, means that there must be a plurality of regions having distinct porosity. Transitions between porosity in some embodiments may be gradual. This means that multi-layer encompasses both structures having multiple gradual transitions of porosity and structures having multiple abrupt transitions of porosity. Consistent with this definition, the layers $12_1$-$12_N$ are defined by varying porosity, which may change gradually or abruptly. Also, the use of "layer" encompasses separate deposits, for example, but also encompasses continuous structures having the varying porosity. In other words, "layer" includes but does not solely imply separate formation processes or depositions.

The multi-layer porous thin film structure of layers or regions $12_1$-$12_N$ having varying porosity is shown in FIG. 1 as being formed on a substrate 14. However, embodiments of the invention include particle structures of multi-layer thin films such as the layers $12_1$-$12_N$ released from a substrate upon or from which they were initially formed. The porous layers $12_1$-$12_N$ are encoded by a code or codes selected from a library of codes and introduced into the layers by a computer controlled etch to apply the codes to produce an interference pattern in the reflectivity spectrum that forms an optical signature correspond to the code or codes selected from the library. Light reflected at the interfaces between the porous layers $12_1$-$12_N$ interferes with light form interfaces between other ones of the layers to generate an interference pattern in the reflectivity spectrum. Particles 10 of the invention are specifically encoded by the code from a library of codes that is used to controlling etching conditions and layer thicknesses during formation of the particle 10. The refractive index at layer interfaces, chemical composition, and thickness of each layer $12_1$-$12_N$ affects the optical signature generated by a particular particle. Thus, varying the relative porosity between layers in an individual particle (to affect the refractive index) and varying the layer thickness during formation of the particle 10 permits the tailoring of particular optical signatures in the reflectivity spectrum. Porosity also affects the intensity of peaks in the reflectivity spectrum, providing additional encoding potential. Each code or group of codes selected from the library can be used to reproduce the same optical signature over and over again, permitting the manufacture of particles having the same codes. In addition, different codes may be selected from the library of codes to produce particles having different optical signatures.

The porous layers $12_1$-$12_N$ may be formed of any porous semiconductor or insulator. In preferred embodiment particles of the invention, porous silicon is used to form the layers $12_1$-$12_N$. Controlled anodic etching of crystal silicon in hydrofluoric acid solution permits control of both the porosity and thickness of porous layers $12_1$-$12_N$. In general, the time of etching controls the thickness of a porous layer, while the etching current density controls the porosity. In addition, the timing of the application of current density affects the optical signature that will be produced. The thicknesses and porosities of layers $12_1$-$12_N$ may be varied with respect to each other to produce a particular optical signature. Codes in the library of codes have variations in the duration, level and timing of etch current density and each code in the library will produce a unique optical signature in a given material, e.g. silicon, that is etched to produce a coded particle.

Variance in the porosity and thicknesses follows a pattern established according to the code selected from the library of codes. In some embodiments, the porosity may vary gradually and in others the porosity may change abruptly from layer to layer. Porous silicon is a preferred material for the layers $12_1$-$12_N$. Porous silicon has a number of demonstrated advantages. For example, porous silicon has been demonstrated to be biocompatible. In addition, the surface chemistry of oxidized porous silicon is effectively that of silica. Accordingly, the surface chemistry is well understood for biochemical derivatization and ligand immobilization.

In preferred embodiments, the layers $12_1$-$12_N$ are formed to include a receptor material within the porous structure. The purpose of the receptor is to bind a particular analyte of interest. Exemplary receptors (also referred to as binders) are disclosed, for example, in U.S. Pat. No. 6,248,539 entitled "Porous Semiconductor Based Optical Interferometric Sensor". Receptor molecules may be adsorbed or otherwise associated with the porous silicon layers $12_1$-$12_N$ by any approach that leads to the tethering of the receptor molecules to the porous layers $12_1$-$12_N$. This includes, without limitation, covalently bonding the receptor molecules to the semiconductor, ionically associating the receptor molecules to the layers, adsorbing the receptor molecules onto the surface of the layers, or other similar techniques. Association can also include covalently attaching the receptor molecules to another moiety, which is in turn covalently bonded to the porous layers $12_1$-$12_N$, or binding the target molecule via hybridization or another biological association mechanism to another moiety which is coupled to the porous layers $12_1$-$12_N$. Specific additional examples include receptor ligands that have been attached to porous silicon layers to produce biosensors. An analyte bound to a particle 10 of the invention becomes identifiable and traceable by the encoding provided by the particle 10.

Figure 2A:
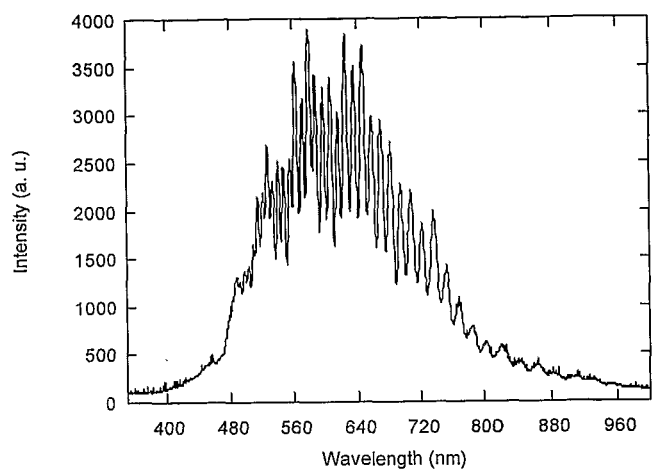
FIGS. 2A and 2B illustrate a preferred embodiment Fourier transform particle decoding.
Figure 2B:
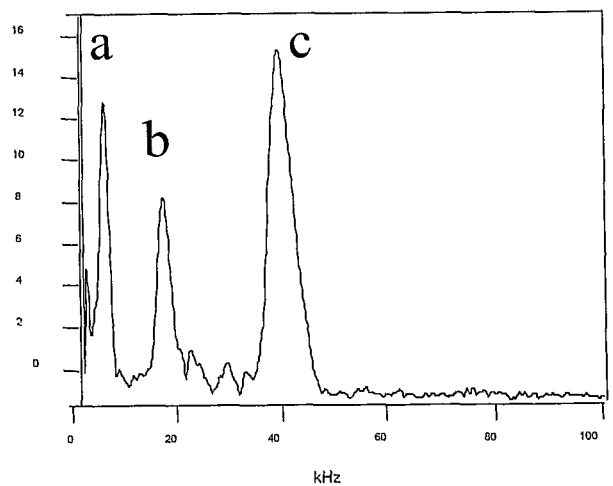

Encoding is possible for both intensity and wavelength properties of multi-layer films $12_1$-$12_N$. A preferred embodiment is a particle 10 having multi-layer films $12_1$-$12_N$ that have mismatched optical thicknesses with generally planar interfaces therebetween. Optical thickness is defined as the refractive index of a layer multiplied by its metric thickness. Referring to FIGS. 2A and 2B, a particle 10 encoded in such a manner reveals an optical signature in a Fourier transform of the resulting reflectivity interference spectrum. An exemplary resulting interference spectrum is shown in FIG. 2A. The Fourier transform shown in FIG. 2B reveals an optical signature with well-resolved peaks. Particles 10 may be set to have a distinct series of peaks (a, b, c).

The intensity of peaks in the reflectance spectrum is controlled by the refractive index at interfaces between layers $12_1$-$12_N$, determined by a change in porosity between adjacent layers. Such change may be gradual or sharp. The position of peaks is controlled by adjusting layer thicknesses. Additional encoding is possible by variation of the relative intensities of each reflectivity peak, which can be engineered into particles 10 of the invention by adjustment of the electrochemical etch parameters to control porosity of the layers $12_1$-$12_N$. Accordingly, an N-layer particle 10 having A resolvable positions for each peak and B resolvable intensities can encode $(A*B)^N$ particles. Additionally, a particle 10 having N peaks with A resolvable positions for each peak with any combination of order of relative intensities can encode one of $N!(A)^N$.

Embodiments of the invention include complexly encoded particles and particle systems. Specifically, particles are encoded by a galvanostatic anodic etch of crystalline P+(~1 mOhm/cm) silicon wafers. Thickness and porosity of the porous layer is controlled by the current density over time and the composition of the etchant solution. Computer generated waveforms permit complex encoding strategies. Application of computer generated waveforms to control the duration of the etch cycles, making each unique from one to the next, to make the porosity and therefore the effective refractive index vary in direct correspondence to the applied current waveform. After the encoded portion of the current waveform has run its course a current pulse of short duration and high magnitude can be applied to remove the resulting porous matrix from the wafer. The free porous matrix comprises a photonic crystal particle. Masking of the wafer before etching permits differently shaped particles to be produced. The shapes provide an additional opportunity for recognition.

Repetition of the process using carefully controlled computer waveforms permits forming large libraries of unique particle types. These libraries may be used to form test kits. Libraries and particular particle types form the basis for a high-throughput screening and bioassay process(es).

An approach to data extraction and analysis may embody all of the complexity of the spectra, which results from the reflectivity properties of the photonic crystals. Unlike conventional bioassay systems, which couple fluorescent encoding methods with fluorescent assays, our technique does not have the problem of spectral overlap of the encoding method with the assay readout. Spectral lines are not used as bits in a method of the invention. An assay detection method, for example, is based upon reflection and detects spectral shift, not the presence, degree of presence, concentration or absence of a spectral peak. Possibilities for spectral recognition include multivariate analysis, and relative and ratiometric multiple peak analysis.

Another encoding strategy involves periodic structures. Exemplary periodic structures include particles 10 having layers $12_1$-$12_N$ configured by porosity and thickness to form a Bragg stack or a Rugate filter. Bragg stacks, for example, may be generated by alternating layers having matched optical thicknesses. A Bragg stack defined by varying porosity layers $12_1$-$12_N$ in a particle 10 of the invention will produce peaks in the reflectivity spectrum with full width half maximum peaks in the reflectivity spectrum that are very well resolved, e.g., ~10 nm. Rugate filters produced by variation of the refractive index of the interfaces through multi-layer structures $12_1$-$12_N$ also generate similarly narrow peaks in the reflectivity spectrum while also suppressing side bands and higher order reflections.

Figure 3A:
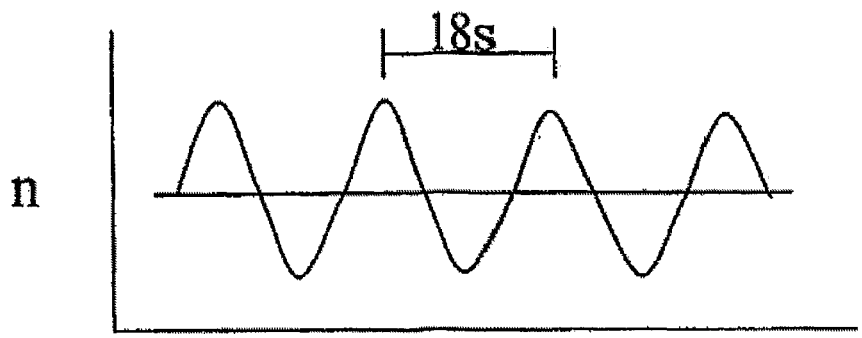
FIG. 3A illustrates an exemplary etching waveform for a preferred embodiment method of Rugate particle encoding.
Figure 3B:
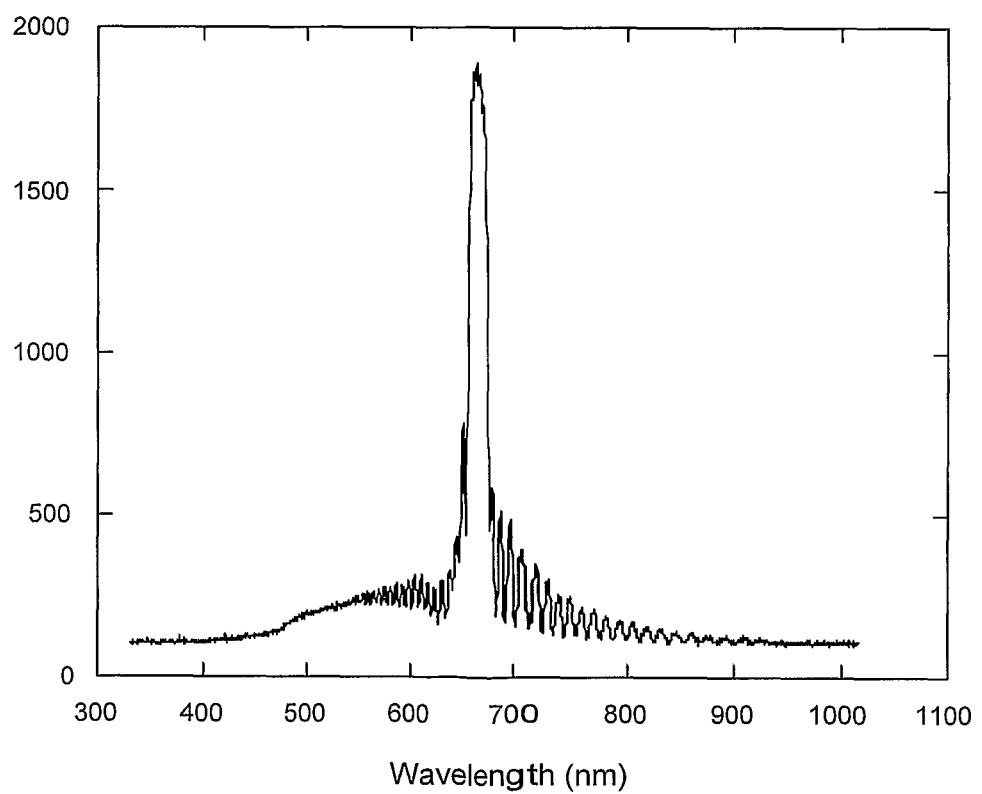
FIG. 3B illustrates a preferred embodiment Rugate particle decoding.

FIGS. 3A and 3B illustrate a preferred embodiment Rugate particle encoding strategy. A Rugate encoded particle may be created by etching a semiconductor or insulator with a periodic variance of etching conditions, such that the refractive index in the material varies in a sinusoidal (or apodised sinusoidal) function. The structures can be generated by etching the silicon wafer with a pseudo-sine current waveform. FIG. 3A indicates that a period for an exemplary sine wave variation of etching current density (n) in an etch used to produce the exemplary embodiment was 18 seconds. As seen in FIG. 3B, a well-resolved narrow peak results from the encoding. The intensity and location of the peak can be varied with layer thickness and refractive index.

Figure 4:
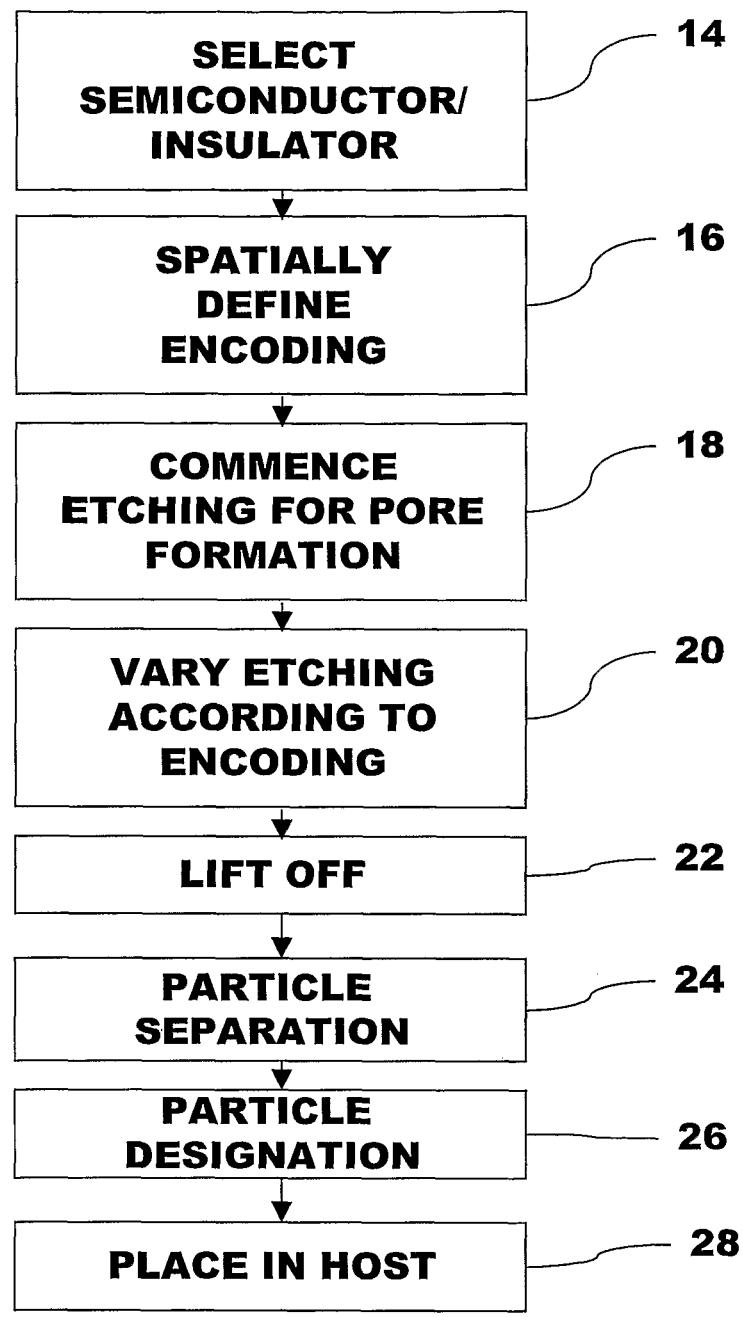
FIG. 4 illustrates a preferred embodiment method of fabricating encoded particles.

Referring now to FIG. 4, a preferred method for forming an encoded porous particle 10 is shown. A suitable semiconductor or insulator, e.g., a silicon wafer, is selected for processing (step 14). For example, silicon wafers may be cut to size and be masked to have portions exposed for etching. An exemplary suitable silicon material is a single crystalline silicon wafer. Spatial encoding is then defined (step 16). The spatial encoding defines a range of codes over the material to be etched. Conducting a spatially resolved etch allows codes to be programmed in particle-sized sections of the wafer. An exemplary spatially resolved etch is disclosed in U.S. Pat. No. 5,318,676, entitled "Photolithographic fabrication of luminescent images on porous silicon structures", published Jun. 7, 1994. In an alternative process, the step of spatial defining (step 16) is omitted. For example, a single wafer or an area of wafer could be etched to include particles having a single code. In that case, other wafers could be etched to have particles having a different code. Anodic etching is then commenced, for example, in an aqueous solution of hydrofluoric acid and ethanol (step 18). Etching is then conducted with etching conditions varying according to the defined encoding strategy (step 20). A code or codes of the invention are etched into the wafer. The traverse (vertical direction in FIG. 1) encoded but still connected particles may be lifted off from the silicon wafer (step 22), for example by a high level of electropolishing current. Areas between spatially defined etch sections may be cut to separate differently encoded wafer sections. Individual particles are then separated (step 24) in a dicing that may be conducted, for example, by mechanical agitation or ultrasonic fracturing. The particle separation (step 24) preferably produces micron-sized particles, e.g., particles in a range from a few hundred nanometers to a few hundred micrometers. A step of particle designation (step 26) may be conducted after the particle separation (step 24) or subsequent to step 20 or step 22. Particle designation may comprise, for example, chemical modification of the porous multi-layer structure $12_1$-$12_N$ for specific biological, biomedical, electronic, or environmental applications. As an example, the particles can be modified with a receptor for a desired analyte or with a targeting moiety (such as a sugar or a polypeptide). Additionally, binding can be signaled, for example, by fluorescence labeling of analytes or analyte autofluorescence. In use of particle 10, the particle can be identified by its optical signature upon binding of the designated targeted analyte. This step of designation may also be omitted in embodiments of the invention.

In other embodiments of the invention, encoded particles can be placed into a suitable hosts, namely any liquid, powder, dust, or other material that will hold encoded micron sized particles of the invention. Particles placed in hosts, for example, could be used to identify the source of a manufactured powder such as an explosive. Another potential host is an animal. Particles of the invention being biocompatible may be implanted in vivo into an animal host. The reflectivity spectrum of preferred embodiment porous silicon particles 10 of the invention, for example, encompasses the visible, near infrared, and infrared spectra. This presents the opportunity to sense the code of a particle of the invention through barriers such as living tissue.

Example Embodiments and Experimental Data

Example embodiments of the invention will now be discussed. Experimental data is included for the purpose of illustrating to artisans the potential of the invention. Where given, equipment is specified only to allow artisans to understand experimental data reported herein. Commercial embodiment devices of the invention may take substantially different form, permitting low cost mass manufacturing, for example.

A first example embodiment is stand-off detection. This is a chemical detection technique to identify an analyte from a distance. A particle 10 of the invention includes a receptor to sense a particular analyte. Both the code of the particle and an indication of binding of the analyte can be detected in the reflectivity spectrum, for example, with use of a low power laser. The receptor, for example, can be specific to sense biomolecules or to attach the encoded particle to a cell, spore, or pollen particle.

A test of stand-off detection was conducted with exemplary encoded multi-layer porous silicon films. The multi-layered porous silicon films were prepared by an electrochemical etch of a (100) oriented polished Si wafer ($p^{++}$-type, B doped, <1 mΩ-cm resistivity) in a 1:3 ethanol:48% aqueous HF solution. The etching current density was modulated periodically with a pseudo-sine wave (between 11.5 and 34.6 mA/cm$^2$) to generate a sinusoidally varying porosity gradient. The films were removed from the substrate by applying a 30 second electropolishing pulse of current density of 600 mA/cm$^2$. The freestanding films were then made into particles by mechanical grinding or by ultrasonic fracture to produce particles of sizes ranging from several hundred nanometers to a few hundred microns. The optical reflectivity spectrum in FIG. 5 approximates a Rugate filter, displaying a sharp reflection maximum at a wavelength and source-sample-detector angle that satisfies the Bragg equation and appropriate phase matching condition.

Figure 5:
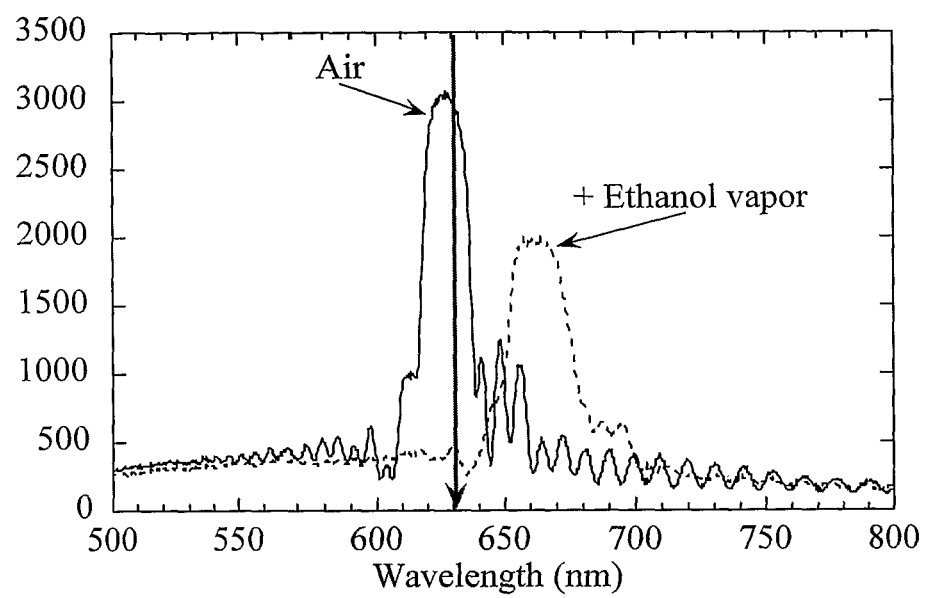
FIG. 5 shows the optical reflectivity spectrum of a single preferred embodiment encoded particle in laboratory air (solid line) and in air containing a small amount of ethanol vapor (dashed line)

The particles were immobilized on a glass plate and mounted in a gas dosing chamber fitted with an optical window and Baratron pressure gauge. The particles were illuminated with a 10 MW He/Ne laser. The as-formed particles strongly reflect the 632 nm light of the He/Ne laser at a wavelength in air, as seen in FIG. 5. The spectral position of the laser used to acquire the data presented in FIG. 5 is shown for comparison (vertical arrow). The data were taken using an Ocean Optics CCD visible spectrometer at the focal plane of an optical microscope. When exposed to analyte vapors, capillary condensation causes the reflectivity spectrum of the particles to shift to longer wavelengths due to an increase in the refractive index of the porous medium and the particles are observed to go dark.

Figure 6:
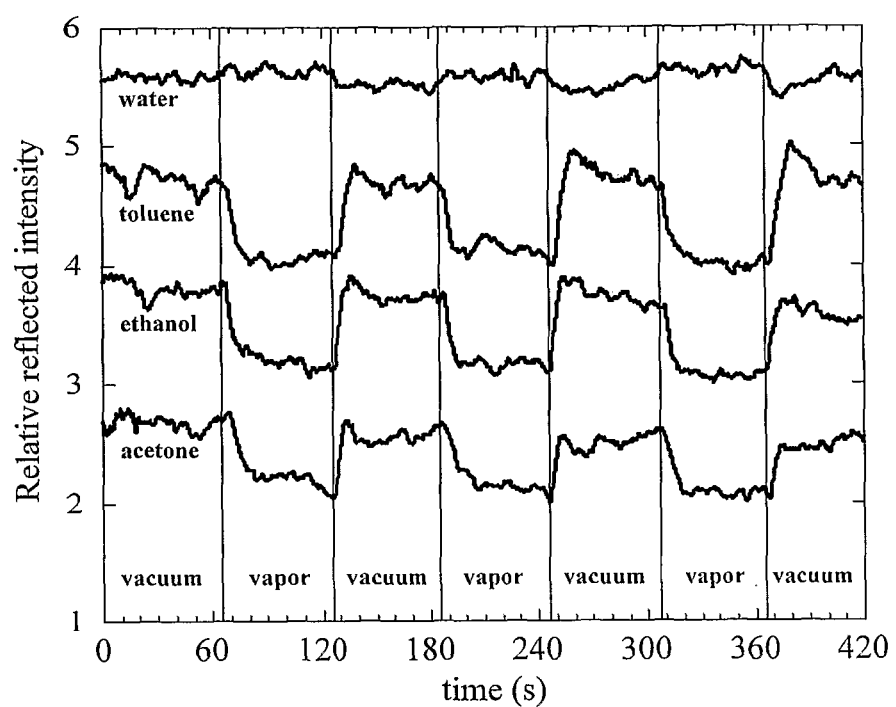
FIG. 6 shows the intensity of reflected laser light (632 nm) from a preferred embodiment encoded porous silicon Rugate particle measured for three exposure/evacuation cycles using (from bottom to top as indicated) acetone, ethanol, toluene and water analytes at their saturation vapor pressures.

The relative change in light intensity simultaneously reflected from many of the particles was quantified at a fixed wavelength (632 nm) for a series of condensable analyte vapors, as seen in FIG. 6. The vapor pressure at 25° C. for each of these analytes is 222, 60, 28, and 24 Torr, respectively. Relative reflected light intensity was measured as the photo-current from an amplified Si photodiode mounted at the objective of the 8-inch Schmidt-Cassegrain collection optics. The sample was 20 m from the laser and detection optics. Spectra are offset along the y-axis for clarity. The vapors were all introduced to the exposure chamber at their saturation vapor pressures. The intensity of reflected light was measured at a distance of 20 m in the presence of normal fluorescent room lighting using chopped light and phase-sensitive detection (Stanford Instruments SR-510 lock-in amplifier). No other optical or electronic filtering was used. The specificity of adsorption and/or microcapillary condensation at porous Si surfaces depends dramatically on the surface chemistry, and the hydrogen-terminated, hydrophobic as-formed material used in the experiments has a much greater affinity for hydrophobic versus hydrophilic analytes. Thus, the particles are relatively insensitive to water vapor at a partial pressure comparable to that used for the more hydrophobic organic analytes. No attempt was made to provide acoustic or vibrational isolation of the sample or optics, and most of the noise observed in the data is attributed to laboratory vibrations. Sensitivity should be further enhanced using a near infrared laser light source, where background radiation and atmospheric adsorption and scattering are less significant.

Another preferred exemplary application of the invention is for biomolecular screening via the encoded particle 10 of the invention. Millions of codes are possible with a small number of layers. A simple antibody-based bioassay using fluorescently tagged proteins has been tested. Periodic Rugate style encoding was used as described above with respect to the exemplary chemical sensing embodiments. By masking the wafer before etching, well-defined slabs of particles were generated, as seen in FIG. 7.

Figure 7:
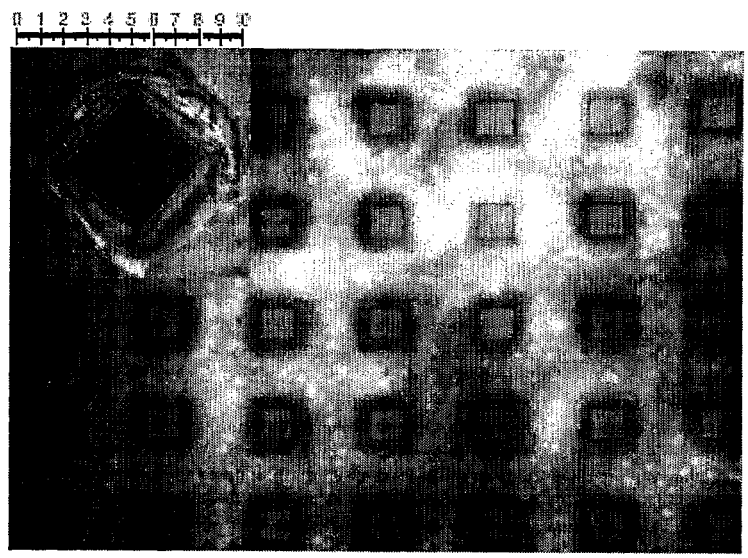
FIG. 7 is an image of exemplary preferred embodiment encoded particles formed in a wafer by a spatially defined, periodically varying etch.

The FIG. 7 particles were prepared to display a photonic spectral maximum at 632 nm. The scale in the inset (reproduced above the figure for clarity) corresponds to 2 μm per small division. The multi-layered encoded particles generated in this fashion display a very sharp line in the optical reflectivity spectrum. This line can appear anywhere in the visible to near-infrared spectral range, depending on the waveform used in the programmed etch.

Figure 8:
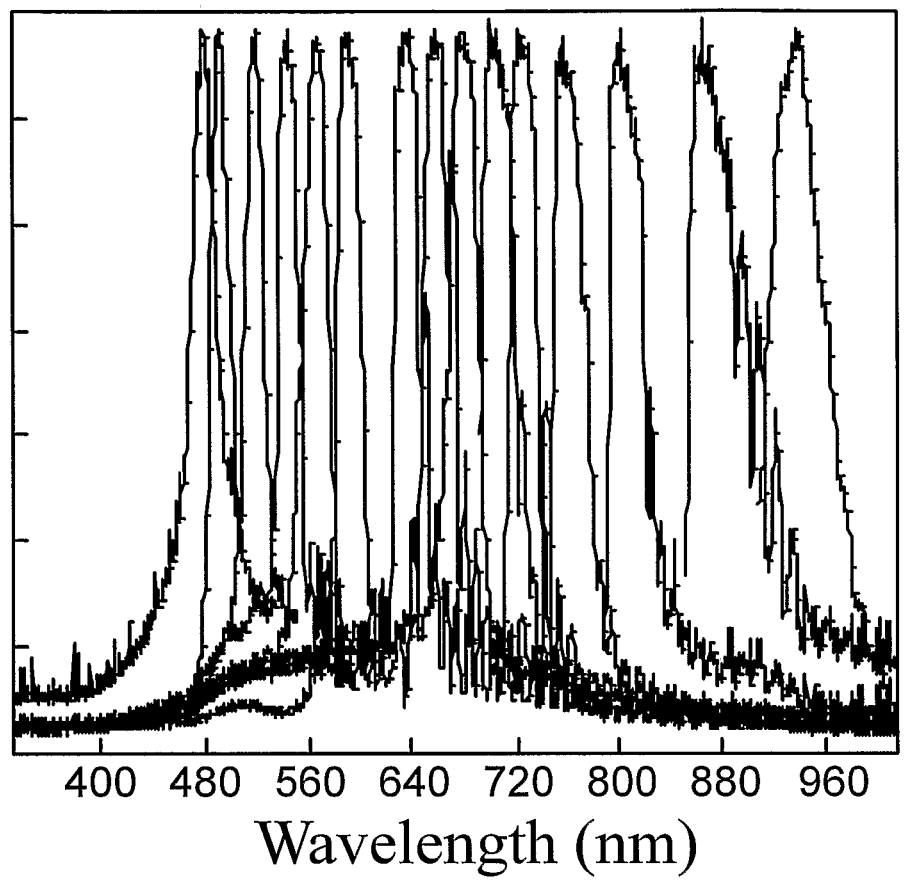
FIG. 8 plots the reflectivity spectra from 15 separately coded exemplary preferred embodiment sample particles.

Exemplary waveforms for 15 separate codes are shown in FIG. 8. FIG. 8 shows the reflectivity spectra of 15 porous-silicon multi-layered samples prepared using a sinusoidal etch (Rugate encoded structure). Each of the samples contains a single Rugate frequency code. Spectra were obtained using a Cambridge Instruments microscope with a 70× objective. The sample was illuminated using a tungsten lamp, and the reflected light spectrum was measured with an Ocean Optics SD2000 CCD (charge-coupled device) spectrometer. The sample particles were prepared by anodically etching $p^{++}$ type, B-doped, (100)-oriented silicon (resistivity <1 $m\Omega\text{-}cm^2$) in a solution of 48% aqueous HF:ethanol (3:1 by volume). Typical etch parameters for a Rugate structure used in a pseudosinusoidal current waveform oscillating between 11.5 and 19.2 mA $cm^{-2}$ with 50 repeats and a periodicity of 18 s. Films were removed from the substrate using a current pulse of 460 mA $cm^{-2}$ for 40 s. Lithographically defined particles were prepared by applying an S-1813 photoresist (Shipley) to the wafer before the electrochemical etch (spin coated at 4,000 r.p.m. for 60 s, soft-baked at 90° C. for 2 min., ultraviolet-exposed using a contact mask aligner, hard-baked at 120° C. for 30 min. before development). The spectral features exemplified by FIG. 8 can be much narrower than the fluorescence spectrum obtained from a molecule or core-shell quantum dot.

Figure 9A:
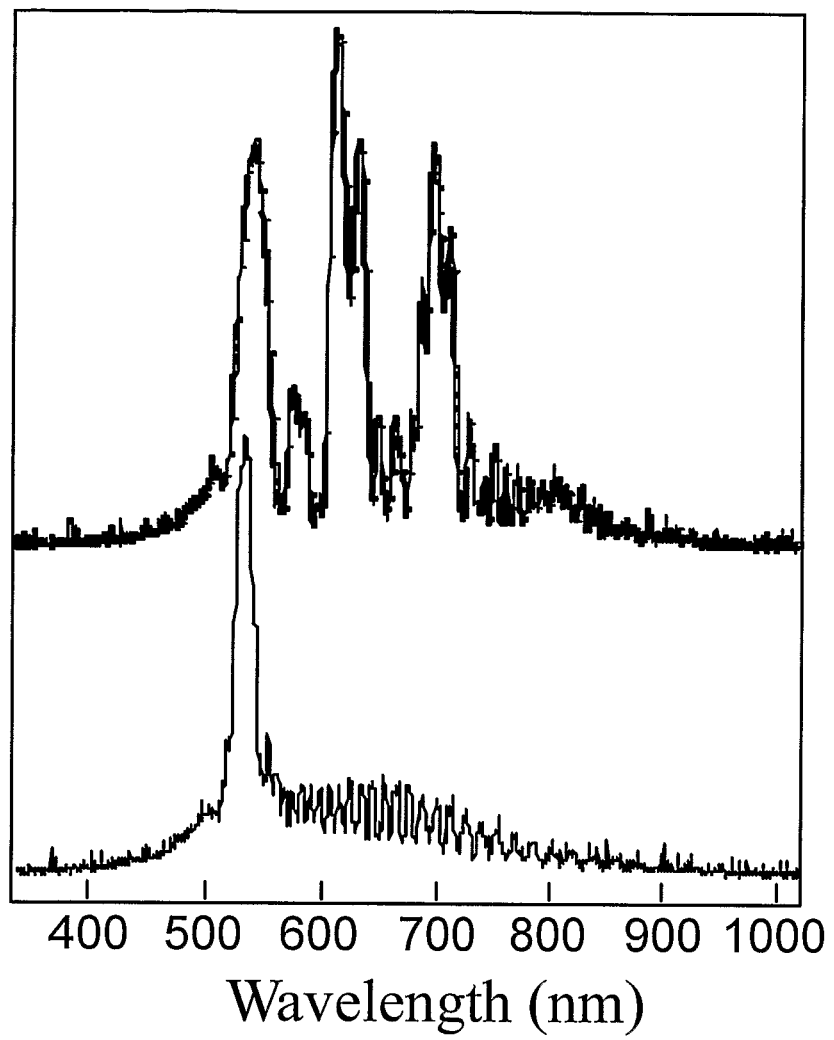
FIG. 9A plots the reflectivity spectra from exemplary preferred embodiment single Rugate encoded sample particles and triply encoded Rugate sample particles.
Figure 9B:
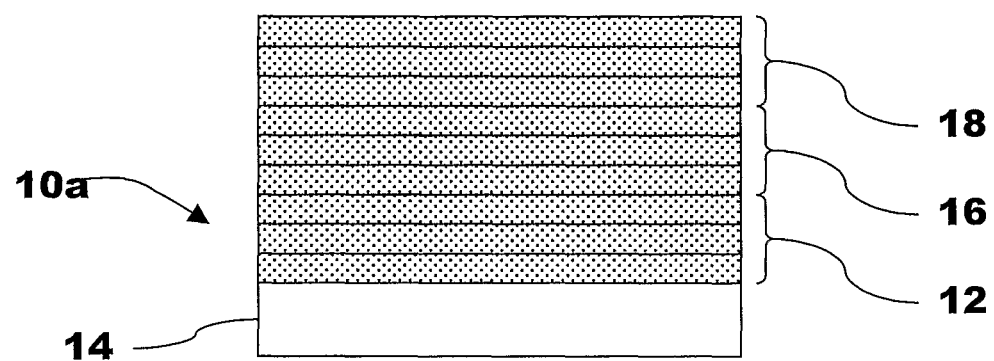
FIG. 9B is a schematic diagram of an exemplary preferred embodiment multiple Rugate encoded particle.

FIG. 9A shows the reflectivity spectra of porous silicon Rugate encoded particles etched with a single periodicity (bottom) and with three separate periodicities (top). FIG. 9B schematically illustrates a preferred embodiment multiple encoded particle 10a, wherein there are three sets of encoded layers 12, 16, and 18. Multiple Rugate codes may be separated spatially, but also may be etched in the same physical location, as sets of multi-layers formed at different depths, each forming a separate Rugate encoding. Each of the layer sets 12, 16, and 18 includes a periodically varying porosity to produce a separate Rugate, or alternatively, Bragg, code.

The example particles display peaks in the reflectivity spectrum characteristic of their multi-layered structures. The sample represented in the bottom spectrum was etched using a sinusoidal current variation between 11.5 and 19.2 mA $cm^{-2}$ with 50 repeats and a periodicity of 18 s. The triply encoded particle (triple Rugate) represented by the top spectrum was prepared using a sinusoidal current variation oscillating between 11.5 and 34.6 mA $cm^{-2}$ with a periodicity of 10 s for 20 periods (520 nm), 12 s for 45 periods (610 nm), and 14 s for 90 periods (700 nm). The approximate thickness of this sample is 15 μm. Spectra are offset along the y axis for clarity.

To test the reliability of the encoding approach in a biological screening application, we prepared two different batches of encoded particles as single Rugate structures. Both batches of particles were ozone-oxidized to improve their stability in aqueous media and to provide a hydrophilic surface. The particles were oxidized in a stream of $O_3$ diluted with compressed air. Control particles coded with a 750-nm spectral feature were treated with concentrated BSA (Sigma, 5 g in 100 ml of double-distilled water) and incubated at 37° C. under 5% $CO_2$ in air for three hours. The 540-nm-encoded test particles were exposed to 50 μg $ml^{-1}$ rat albumin in coating buffer (2.93 g $NaHCO_3$, 1.61 g $Na_2CO_3$ in 1,000 ml double-distilled water), and incubated at 37° C. under 5% $CO_2$ for two hours. The test particles were then exposed to a 1:100 dilution of primary rabbit anti-rat-albumin antibody in a concentrated solution of BSA at 37° C. under 5% $CO_2$, for one hour. Both batches of particles were then mixed together and incubated for one hour in the presence of FITC- (fluorescein isothiocyanate) conjugated goat anti-rabbit immunoglobulin-G in a BSA solution. Detection of analyte binding to the encoded particles was then performed by fluorescence and spectral reflectance microscopy.

Figure 10:
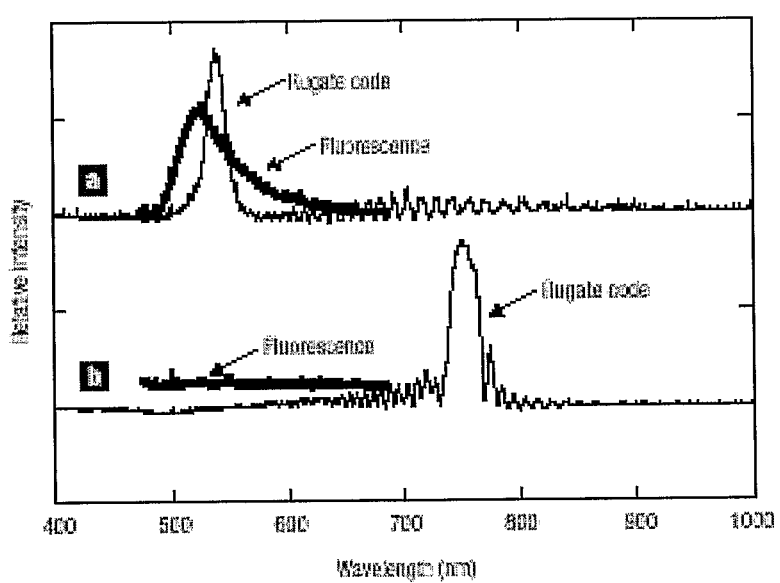
FIG. 10 plots decoding results for exemplary preferred embodiment single Rugate encoded particles prepared for biological screening

Decoding results are shown in FIG. 10. Decoding, performed on 16 particles, yielded the following results: among eight green fluorescent particles, eight particles were positively decoded as belonging to the functionalized rat albumin batch (plot A in FIG. 10). Among the eight non-luminescent particles, six particles were correctly decoded (plot B in FIG. 10), one particle displayed the incorrect code and one particle was unreadable. Presumably, the particle that displayed the incorrect code belonged to the first batch but was not sufficiently functionalized with rat albumin to generate fluorescence in the antibody assay. This is understandable because in the experiment the rat albumin was not covalently attached to the silica-coated particles. A variety of stable chemical modification chemistries have been developed for oxidized and non-oxidized porous silicon, and some of these have been demonstrated with specific antibodies or receptors. Thus, the issue of immobilizing biochemical or chemical components is easily addressable. Additionally, chemical modification can prevent corrosion in aqueous media, which may otherwise lead to undesirable shifts in the optical code and/or unreadable particles. In the conducted experiments, no passivating chemical treatments, other than ozone oxidation to generate a layer of silica, were performed, and upon immersion in basic aqueous media the spectral codes were observed to shift between 0 and 50 nm depending on the incubation times.

The layered porous-silicon encoded structures offer several advantages over existing encoding methodologies. Porous-silicon encoded structures can be constructed that display features spanning the visible, near-infrared and infrared regions of the spectrum. In addition, the reflectivity spectra of Rugate filters can exhibit much sharper spectral features than can be obtained from a gaussian ensemble of quantum dots. In other embodiments, spectral shifts are used for detection, thus avoiding spectral overlap of the encoding method with an assay readout. The invention includes a library of differently encoded particles, and also includes particles of different shapes.

More codes can be placed in a narrower spectral window with the porous encoded structures. Unlike encoding schemes based on stratified metallic nanorods, fluorescence or vibrational signatures, encoded particles of the invention can be probed using light diffraction techniques; thus it is not necessary to use imaging optics in order to read the codes. Encoded particles may be assayed using a conventional fluorescence tagging technique, and sensitive chemical and biochemical detection can also be built into the optical structure of the encoded particles, eliminating the need for fluorescent probes and focusing optics. In addition, because preferred embodiment oxidized porous-silicon encoded particles present a silica-like surface to the environment, they do not readily quench luminescence from organic chromophores, and they can be handled and modified using the chemistries developed for glass bead bioassays. Silicon-based encoded particles may be readily integrated with existing chip technologies.

The use of encoded silicon particles of the invention in medical diagnostic applications has advantages over organic dyes or quantum dots. In vivo studies have shown the biocompatibility of porous silicon, as well as the long-term stability of reflectance data from multilayer structures. Additionally, the possibility of optically addressing particles at near-infrared, tissue-penetrating wavelengths without the losses associated with low fluorescence quantum yields makes these materials amenable to in vivo diagnostics. Finally, because the porous codes are an integral and orderly part of the porous structure, it is not possible for part of the code to be lost, scrambled or photobleached, as can occur with quantum dots or fluorescent molecules.

Figure 11:
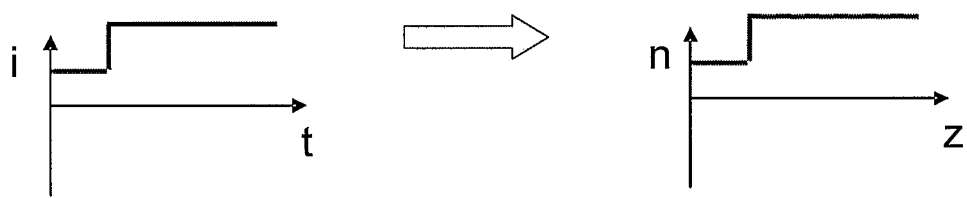
FIG. 11 shows an example library code waveform and resultant refractive index code in porous silicon.

Some specific codes to exemplify complex encoding that may be used to build a library of codes will now be discussed. FIG. 11 shows an example code and resultant refractive index in porous silicon. The code is a waveform that has a particular etch current density applied according to a time as shown in the current versus time plot of FIG. 11 and it results in a particular refractive index versus depth profile code in the material which is an etched deformed porous material, as indicated in the right side of FIG. 11.

Experiments were conducted to verify that the library of codes can be construed by conducting experiments with different etched currents versus time according to the information in the following tables:

TABLE I

| Code | t low (min) | t high (min) |
|------|-------------|--------------|
| 1 | 0 | 8 |
| 2 | 2 | 6 |
| 3 | 4 | 4 |
| 4 | 6 | 2 |
| 5 | 8 | 0 |

TABLE II

| Sample | Code | Start Time of Etch |
|--------|------|--------------------|
| W3_19 | 3 | 10:50 |
| W3_15 | 1 | 11:05 |
| W3_11 | 5 | 11:18 |
| W3_1 | 2 | 11:33 |
| W3_7 | 4 | 11:48 |
| W3_10 | 2 | 12:08 |
| W3_12 | 5 | 12:20 |
| W3_9 | 3 | 12:36 |
| W3_21 | 4 | 12:51 |
| W3_6 | 1 | 1:06 |

Figure 12:
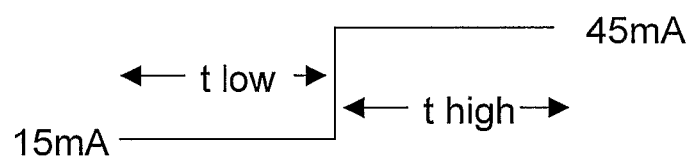
FIG. 12 shows an example library code waveform.

Table I above describes the timing of a waveform shown in FIG. 12. The waveform included an initial low current 15 milliamps followed by a high current at a particular timing of 45 milliamps. The currents were applied using a PCI-6042E DAQ card in a Princeton Instruments Model 363 potentiostat/galvenastat at 2000 updates per second to an approximate 1 milliohm T-type silicon wafer via a platinum mesh electrode. The etched solution is composed of 48% hydrofluoric acid in ethanol at a ratio of 3:1. Samples were washed with ethanol after etching and placed in a vacuum desecrator until spectra were taken. Spectra were acquired using an ocean optic SD2000CCD spectrometer, during a ten minute period with at 22 milliseconds with a 0.1 second delay and no averaging. Table II shows different samples and the codes that were applied to the different samples. Table I shows the five codes. Results were obtained for each of two samples and the two samples of each given code showed that the resultant optical signatures possessed unique identifiable characteristics. A slight offset between replicates results from imprecision in the experimental fabrication process. A commercial manufacturing process can reduce offset. Slight variations between crystals etched with the same code are permissible, in any event, as artisans will appreciate. Many techniques exist for comparing slightly different optical signatures and determining a substantial match to a code. For example, the overall waveform envelope, as well as the number of fringes, their frequencies, etc., relative to some internal reference in the code (i.e. the first, middle and last fringe) can be used to discriminate between replicates and other codes using methods such as principle component analysis or another multivariate analysis method. The patterns in optical signatures resulting from etching in accordance with the invention therefore form recognizable codes, and information sufficient to identify the characteristic patterns can be stored for purposes of identification in a pattern code library, for example.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A traceable encoded micron-sized semiconductor particle or insulator particle having an integral and ordered physical multi-layer porosity structure with multiple porosity interfaces between consecutive multiple porosity layers, the multiple porosity layers having multiple optical thicknesses, wherein the physical multi-layer porosity structure of the multiple porosity interfaces, multiple porosity layers and multiple optical thicknesses is tailored with an optical signature in the form of an interference pattern in a reflectivity spectrum specifying the computer waveform that etched the particle.

2. The particle of claim 1, further comprising a receptor within the pores of the physical multi-layer porosity structure.

3. The particle of claim 2, wherein said receptor is a receptor for a biological analyte.

4. The particle of claim 2, wherein said receptor is a receptor for a chemical analyte.

5. The particle of claim 2, wherein said receptor is a receptor for a gaseous analyte.

6. The particle of claim 2, further comprising a fluorescence tag within the pores of the particle for assaying the particle.

7. The particle of claim 1, wherein the particle comprises porous silicon.

8. A library of optically traceable encoded particles, comprising a plurality of particles, wherein each individual particle has a unique integral and ordered physical multi-layer porosity structure with multiple porosity interfaces between consecutive multiple porosity layers, the multiple porosity layers having multiple optical thicknesses, wherein the physical multi-layer porosity structure of the multiple porosity interfaces, multiple porosity layers and multiple optical thicknesses is tailored with an optical signature in the form of an interference pattern in a reflectivity spectrum specifying the computer waveform that etched the particle.

9. The library of claim 8, wherein the multiple porosity interfaces comprise generally planar interfaces.

10. The particle of claim 1, wherein the multiple porosity interfaces comprise generally planar interfaces.

11. A plurality of groups of particles of claim 1, wherein a first group consists of a plurality of identically structured particles, each of which is configured to produce a first optical signature in the form of an interference pattern in a reflectivity spectrum specifying the computer waveform that etched the first group of particles, and a second group consists of a plurality of identically structured particles, each of which is configured to produce a second optical signature in the form of an interference pattern in a reflectivity spectrum specifying the computer waveform that etched the second group of particles.

12. The particle of claim 1, comprising an exposed surface for accepting analyte into pores of the physical multi-layer porous structure.

13. The particle of claim 12, wherein the exposed surface comprises an ozone-oxidized hydrophilic surface.

14. A traceable encoded micro-sized semiconductor particle or insulator particle, comprising:
- a first porous layer, with a first porosity; and
- a second porous layer with a second porosity that is different than the first porosity,
- wherein the porosity of the first porous layer transitions to the second porous layer through a gradual or abrupt porosity interface, and
- wherein the first porosity, the second porosity, and the transition from the first porous layer to the second porous layer is tailored and configured to produce an optical signature defined by an interference pattern in a reflectivity spectrum specifying the computer waveform that etched the particle,
- wherein at least one of the first and second porous layers provides an exposed planar surface.

15. The particle of claim 1, wherein a Fourier transform of the interference pattern in the reflectivity spectrum comprises a distinct series of peaks that define the optical signature.

16. The particle of claim 8, wherein a Fourier transform of the interference pattern in the reflectivity spectrum comprises a distinct series of peaks that define the optical signature that is unique for each of the plurality of particles.

17. The particle of claim 14, wherein a Fourier transform of the interference pattern in the reflectivity spectrum comprises a distinct series of peaks that define the optical signature.

* * * * *

UNITED STATES PATENT AND TRADEMARK OFFICE
CERTIFICATE OF CORRECTION

| | | |
|---|---|---|
| PATENT NO. | : 9,181,634 B2 | Page 1 of 1 |
| APPLICATION NO. | : 10/583920 | |
| DATED | : November 10, 2015 | |
| INVENTOR(S) | : Michael J. Sailor et al. | |

It is certified that error appears in the above-identified patent and that said Letters Patent is hereby corrected as shown below:

In the Specification:

Col. 4, line 13    After "light" please delete "form" and insert --from-- therefor.

Col. 4, line 30    After "$12_1$-$12_N$" please insert a --.--.

Col. 7, line 21    Please delete "hosts" and insert --host-- therefor.

Col. 11, line 13   Please delete "construed" and insert --constructed-- therefor.

Signed and Sealed this
Ninth Day of August, 2016

Michelle K. Lee
*Director of the United States Patent and Trademark Office*